United States Patent [19]

Takagi

[11] Patent Number: 4,964,210

[45] Date of Patent: Oct. 23, 1990

[54] METHOD OF CONNECTING STATOR COIL OF MOTOR

[75] Inventor: Kunio Takagi, Obu, Japan

[73] Assignee: Aisan Kogyo Kabushiki Kaisha, Obu, Japan

[21] Appl. No.: 490,296

[22] Filed: Mar. 8, 1990

[30] Foreign Application Priority Data

May 1, 1989 [JP] Japan ................................... 1-112493

[51] Int. Cl.$^5$ ............................................ H02K 15/02
[52] U.S. Cl. .................................... 29/596; 219/56.72; 219/91.21; 310/71
[58] Field of Search ..................... 29/596, 598; 310/71; 219/91.21, 91.2, 56.22, 56.1

[56] References Cited

FOREIGN PATENT DOCUMENTS

| | | |
|---|---|---|
| 1690647 | 6/1972 | Fed. Rep. of Germany . |
| 60-7685 | 1/1984 | Japan . |
| 60-144743 | 9/1985 | Japan . |
| 60-144744 | 9/1985 | Japan . |
| 61-84655 | 6/1986 | Japan . |
| 62-125347 | 8/1987 | Japan . |
| 62-135578 | 8/1987 | Japan . |
| 62-185483 | 11/1987 | Japan . |

*Primary Examiner*—Carl E. Hall
*Attorney, Agent, or Firm*—Dennison, Meserole, Pollack & Scheiner

[57] ABSTRACT

A method of connecting an end portion of a stator coil of a motor to a terminal, including the steps of locating an insulating plate on one end surface of a stator; positioning the terminal on one side of the insulating plate opposite to the other side where the insulating plate contacts the stator; positioning the end portion of the stator coil on one side of the terminal opposite to the other side where the terminal contacts the insulating plate; pressing the end portion of the stator coil against the terminal with a contact end portion of a source electrode and a first earth electrode which are in contact with each other; contacting a second earth electrode with the terminal from the opposite side of the insulating plate; and supplying a welding current to the source electrode under the conditions that the contact end portion of the source electrode and the first earth electrode are pressed against the terminal and the end portion of the stator coil and that the second earth electrode is in contact with the terminal. With this method, the deformation of the terminal in conducting welding can be prevented, and it is not necessary to define a space for inserting the welding electrodes in the inside of the stator.

3 Claims, 3 Drawing Sheets

METHOD OF CONNECTING STATOR COIL OF MOTOR

BACKGROUND OF THE INVENTION

The present invention relates to an improved method of connecting an end portion of a stator coil of a motor to a terminal as a metal piece for electrically connecting the stator coil to an external circuit.

There have been proposed some techniques in the prior art relating to a method of connecting a stator coil of a motor.

For example, Japanese Utility Model Laid-open Publication Nos. 60-7685, 60-144743, 60-144744 and 61-84655 disclose a method of connecting an end portion of a stator coil to a terminal by soldering. In such a connecting method by soldering, an operator is required to have a skill for soldering, and a working efficiency is accordingly low. Further, as a soldered portion is checked merely visually, a rejected product will be passed to a subsequent manufacturing step.

Referring to FIGS. 3 and 4 corresponding to another technique disclosed in Japanese Utility Model Laid-open Publication No. 62-125347, a pair of tabs 105 bent downwardly from a terminal 104 are press-fitted into a coil bobbin 114, and a pair of tabs 110 bent upwardly from the terminal 104 are employed for winding of an end portion of a stator coil 102 therearound. According to this method, it is necessary to take into consideration a thickness of the terminal 104, a wall thickness of the coil bobbin 114 is obliged to become large. Accordingly, a space in the coil bobbin 114 for winding the stator coil 102 is limited, causing a reduction in a degree of freedom of designing of the coil.

Referring next to FIGS. 5 and 6 corresponding to a further technique disclosed in Japanese Utility Model Laid-open Publication No. 62-185483, a lead wire 204 employed in substitution for the terminal is preliminarily connected to a stator coil 202, and a connecting portion 205 of the lead wire 204 and the stator coil 202 is inserted through a cable hole 203 to be led to a cable guide 230. Then, the connecting portion 205 is fixedly sandwiched between a holder 201 and the cable guide 230. According to this method, there is a possibility that the holder 201 will be loosened or removed because of vibration or the like of an automobile mounting the motor therein, for example.

Referring next to FIG. 7 corresponding to a still further technique disclosed in Japanese Utility Model Laid-open Publication No. 62-135578, reference numerals 322, 324 and 326 denote a welding source electrode, a first earth electrode and a second earth electrode, respectively. A welding current is supplied from the welding source electrode 322 to a connecting portion 310 between the terminal 304 and an end portion of a stator coil 302, so that heat due to contact resistance may be generated at the connecting portion 310. One end of the source electrode 322 is in contact with one end of the first earth electrode 324.

When the end portion of the stator coil 302 is placed on the terminal 304, a contact portion of the source electrode 322 and the first earth electrode 324 is pressed against the connecting portion 310 between the stator coil 302 and the terminal 304. The connecting portion 310 between the stator coil 302 and the terminal 304 is sandwiched under pressure between the second earth electrode 326 and the contact portion of the source electrode 322 and the first earth electrode 324. Under this condition, electric power is applied to the source electrode 322.

At the beginning of application of the electric power, a welding current is allowed to flow from the source electrode 322 directly to the first electrode 324 because the stator coil 302 is coated with an insulator. However, as a welding time proceeds, heat due to contact resistance between the source electrode 322 and the first earth electrode 324 is generated to melt and remove the insulator coated on the stator coil 302. As a result, all of the source electrode 322, the stator coil 302, the terminal 304 and the second earth electrode 326 are electrically conducted to allow the welding current to divisionally flow from the source electrode 322 through the stator coil 302 and the terminal 304 to the second earth electrode 326. There is also generated heat due to contact resistance between the stator coil 302 and the terminal 304 by the welding current. Then, the terminal 304 is welded to the stator coil 302, thus completing connection between the stator coil 302 and the terminal 304 in several seconds from the beginning of application of the electric power.

In this case, a heat quantity generating at the welding portion is a function of the contact resistance and the welding current. Accordingly, optimum control of welding can be effected by suitably controlling the welding current, thus ensuring the connection. Further, even when a rejected product is manufactured, the determination of rejection can be made easily. Thus, this technique has solved the problems in the previous techniques as shown in FIGS. 3 to 6.

However, in the technique as shown in FIG. 7, the end portion of the stator coil 302 and the terminal 304 under the overlapped condition are sandwiched under pressure between the upper electrodes 322 and 324 and the lower electrode 326. Therefore, it is necessary to define a space for inserting the second earth electrode 326 in the inside of the stator. As a result, another space for mounting a coil bobbin and the other parts in the stator is limited, and accordingly the size of these parts must be made small to cause a reduction in a degree of freedom of designing.

To solve this problem, if all the terminals are so positioned as to press the end portion of the stator coil and the terminal in one direction from the outside of the stator, there will occur another problem that the terminal will be deformed.

SUMMARY OF THE INVENTION

It is accordingly an object of the present invention to provide a method of connecting an end portion of a stator coil of a motor to a terminal which can eliminate a space for inserting the welding electrodes in the inside of the stator to thereby make the stator compact and simplify a welding jig.

According to the present invention, there is provided a method of connecting an end portion of a stator coil of a motor to a terminal, comprising the steps of locating an insulating plate on one end surface of a stator; positioning said terminal on one side of said insulating plate opposite to the other side where said insulating plate contacts said stator; positioning said end portion of said stator coil on one side of said terminal opposite to the other side where said terminal contacts said insulating plate; pressing said end portion of said stator coil against said terminal with a contact end portion of a source electrode and a first earth electrode which are in contact with each other; contacting a second earth electrode with said terminal from the opposite side of said insulating plate; and supplying a welding current to said source electrode under the conditions that the contact end portion of said source electrode and said first earth electrode is pressed against said terminal and said end portion of said stator coil and that said second earth electrode is in contact with said terminal.

With this method, since the end portion of the stator coil and the terminal are sandwiched under pressure between the electrodes and the insulating plate, an undue force in welding can be prevented from being applied to one side surface of the terminal, thus preventing deformation of the terminal. Furthermore, since all the electrodes are positioned on the outside of the stator in welding, it is not necessary to define a space for inserting the electrodes in the inside of the stator.

The invention will be more fully understood from the following detailed description and appended claims when taken with the drawings.

DETAILED DESCRIPTION OF THE PREFERRED EMBODIMENT

Figure 1:
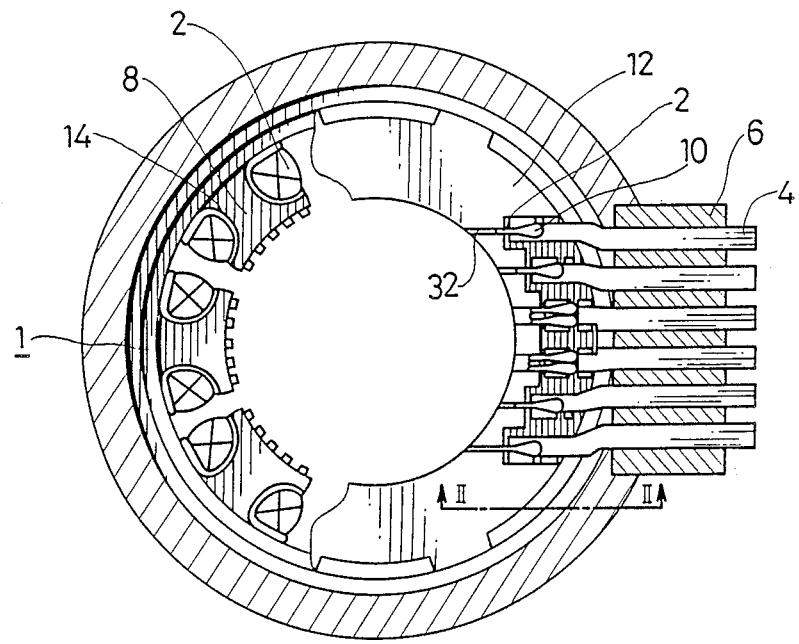
FIG. 1 is a plan view of a stator of a motor to be manufactured by a preferred embodiment of the present invention.
Figure 2:
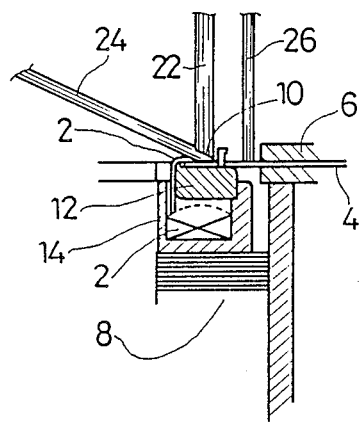
FIG. 2 is a cross section taken along the line II—II in FIG. 1.
Figure 3:
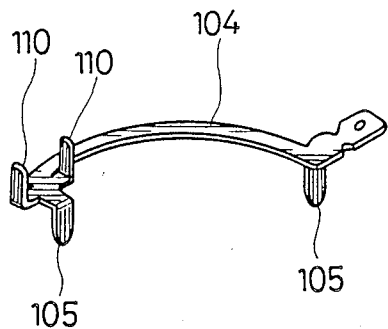
FIG. 3 is a perspective view of a terminal in one example of the prior art.
Figure 4:
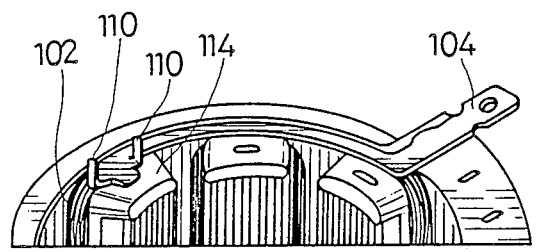
FIG. 4 is a perspective view of an essential part of a stator in which the terminal shown in FIG. 3 is mounted.
Figure 5:
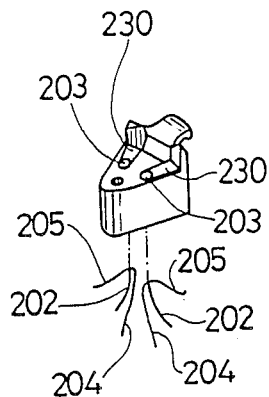
FIG. 5 is a perspective view of a cable guide before a stator coil and a lead wire are set thereto in another example of the prior art.
Figure 6:
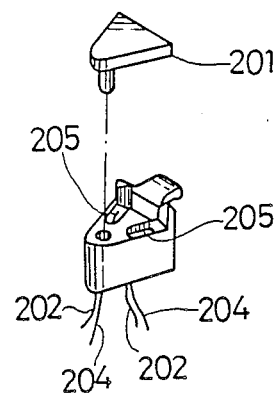
FIG. 6 is a perspective view similar to FIG. 5 after the stator coil and the lead wire are set to the cable guide.
Figure 7:
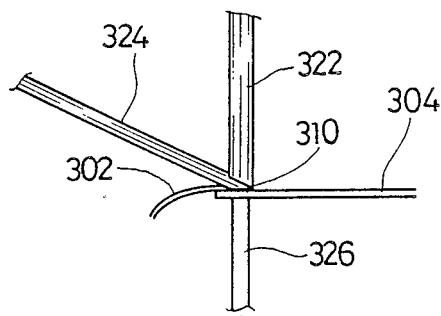
FIG. 7 is a side view illustrating a connecting method utilizing electric welding in a further example of the prior art.

Referring to FIGS. 1 and 2, a magnetic pole 8 of a stator 1 of a motor is manufactured by stacking a plurality of silicon steel plates. The magnetic pole 8 is surrounded by a coil bobbin 14, and a stator coil 2 is wound around a barrel portion of the coil bobbin 14. The stator coil 2 is formed of copper, and it is coated with an enamel for electrical insulation. The coil bobbin 14 and the stator coil 2 are electrically insulated from an external member by means of an insulating plate 12.

The insulating plate 12 is located on the upper side of the stator 1, and it is formed with a cutout 32 for leading out an end portion of the stator coil 2.

A terminal 4 is fixedly mounted in a connector 6. The terminal 4 is formed as a metal piece for electrically connecting the stator coil 2 to an external circuit.

The connector 6 and the terminal 4 are positioned on one side of the insulating plate 12 opposite to the other side where the insulating plate 12 contacts the stator 1. Particularly, a connecting portion 10 between the terminal 4 and the end portion of the stator coil 2 contacts the insulating plate 12. The terminal 4 is formed of phosphor bronze, and it is plated with tin.

The end portion of the stator coil 2 is guided through the cutout 32 of the insulating plate 12 to the connecting portion 10, and is so placed as to overlap the terminal 4.

Reference numerals 22, 24 and 26 denote a welding source electrode, a first earth electrode and a second earth electrode, respectively. A welding current is supplied from the welding source electrode 22 to the connecting portion 10 between the terminal 4 and the end portion of the stator coil 2, so that heat due to contact resistance may be generated at the connecting portion 10. One end of the source electrode 22 is in contact with one end of the first earth electrode 24.

When the end portion of the stator coil 2 is placed on the terminal 4, a contact portion of the source electrode 22 and the first earth electrode 24 is pressed against the connecting portion 10 between the stator coil 2 and the terminal 4. As the terminal 4 is in contact with the insulating plate 12, the connecting portion 10 between the stator coil 2 and the terminal 4 is sandwiched under pressure between the insulating plate 12 and the contact portion of the source electrode 22 and the first earth electrode 24. At the same time, the second earth electrode 26 contacts the terminal 4 in the same direction as a pressing direction of the source electrode 22. Under this condition, electric power is applied to the source electrode 22.

At the beginning of application of the electric power, a welding current is allowed to flow from the source electrode 22 directly to the first earth electrode 24 because the stator coil 2 is coated with an enamel insulator. However, as a welding time proceeds, heat due to contact resistance between the source electrode 22 and the first earth electrode 24 is generated to melt and remove the enamel insulator coated on the stator coil 2. As a result, all of the source electrode 22, the stator coil 2, the terminal 4 and the second earth electrode 26 are electrically conducted to allow the welding current to divisionally flow from the source electrode 22 through the stator coil 2 and the terminal 4 to the second earth electrode 26. There is also generated heat due to contact resistance between the stator coil 2 and the terminal 4 to melt and diffuse the tin plating on the terminal 4. Then, the molten tin of the terminal 4 is bonded to the copper of the stator coil 2, thus completing the connection between the stator coil 2 and the terminal 4 in several seconds from the beginning of application of the electric power.

The insulating plate 12 and the connector 6 are formed of phenol resin in consideration of a thermal strength and a mechanical strength as a receptacle member and an assist member when the electrodes are urged against the terminal 4 and the end portion of the stator coil 2.

In the above-mentioned method, a heat quantity generating at the contact portion can be controlled by controlling a welding current, thus effecting optimum control of welding. Accordingly, the connection of the stator coil 2 and the terminal 4 can be mechanically ensured to thereby improve the quality. Further, in the event that a rejected product is manufactured, the determination of rejection can be made easily.

Furthermore, since all of the electrodes 22, 24 and 26 are urged against the terminal 4 and the end portion of the stator coil 2 from the outside of the stator, it is not necessary to define a space for inserting the welding electrodes in the inside of the stator, thereby making the product compact and simplifying a welding jig.

Having thus described the preferred embodiment of the invention, it should be understood that numerous structural modifications and adaptations may be made without departing from the spirit of the invention.

What is claimed is:

1. A method of connecting an end portion of a stator coil of a motor to a terminal, comprising the steps of:

locating an insulating plate on one end surface of a stator;

positioning said terminal on one side of said insulating plate opposite to the other side where said insulating plate contacts said stator;

positioning said end portion of said stator coil on one side of said terminal opposite to the other side where said terminal contacts said insulating plate;

pressing said end portion of said stator coil against said terminal with a contact end portion of a source electrode and a first earth electrode which are in contact with each other;

contacting a second earth electrode with said terminal from the opposite side of said insulating plate; and supplying a welding current to said source electrode under the conditions that the contact end portion of said source electrode and said first earth electrode is pressed against said terminal and said end portion of said stator coil and that said second earth electrode is in contact with said terminal.

2. The method as defined in claim 1, wherein said insulating plate is formed of phenol resin.

3. The method as defined in claim 1, wherein said stator includes at least a bobbin for winding said stator coil therearound, and said insulating plate is positioned on said bobbin.

* * * * *